(12) United States Patent
Bougelet et al.

(10) Patent No.: US 12,410,735 B2
(45) Date of Patent: Sep. 9, 2025

(54) DEVICE CONFIGURED TO BE MOUNTED ON AN OIL TANK OF AN AIRCRAFT TURBOMACHINE, OIL SUPPLY ASSEMBLY AND ASSOCIATED METHOD OF USE

(71) Applicant: SAFRAN AERO BOOSTERS, Herstal (BE)

(72) Inventors: Stéphane Alain Luc Ghislain Bougelet, Herstal (BE); Charlotte Michelle Frédérique Lambion, Herstal (BE)

(73) Assignee: SAFRAN AERO BOOSTERS, Herstal (BE)

( * ) Notice: Subject to any disclaimer, the term of this patent is extended or adjusted under 35 U.S.C. 154(b) by 0 days.

(21) Appl. No.: 18/725,595

(22) PCT Filed: Jan. 6, 2023

(86) PCT No.: PCT/EP2023/050221
§ 371 (c)(1),
(2) Date: Jun. 28, 2024

(87) PCT Pub. No.: WO2023/135060
PCT Pub. Date: Jul. 20, 2023

(65) Prior Publication Data
US 2025/0067200 A1    Feb. 27, 2025

(30) Foreign Application Priority Data
Jan. 13, 2022   (BE) .................................. 2022/5019

(51) Int. Cl.
*F01M 11/04*    (2006.01)
*F01D 25/18*    (2006.01)

(52) U.S. Cl.
CPC ............. *F01M 11/04* (2013.01); *F01D 25/18* (2013.01); *F01M 2011/0491* (2013.01); *F05D 2260/98* (2013.01)

(58) Field of Classification Search
CPC .. F01M 11/04; F01M 2011/0491; F01D 25/18
See application file for complete search history.

(56) References Cited

U.S. PATENT DOCUMENTS 1,879,205 A * 9/1932 Mott ...................... B65D 51/04
                                                              251/303
3,157,322 A * 11/1964 Bernhardt .......... B65D 47/0823
                                                              222/490

(Continued)

FOREIGN PATENT DOCUMENTS

EP       0045378 A1 *  7/1980

OTHER PUBLICATIONS

International Search Report mailed Mar. 16, 2023, issued in corresponding International Application No. PCT/EP2023/050221, filed Jan. 6, 2023, 6 pages.

(Continued)

*Primary Examiner* — Michael A Riegelman
(74) *Attorney, Agent, or Firm* — CHRISTENSEN O'CONNOR JOHNSON KINDNESS PLLC (57) ABSTRACT

An adapter is configured to be disposed on the inlet of an oil tank of an aircraft engine. The adapter includes a plug between the adapter and the exterior, and a flapper between the adapter and the oil tank. An adapter cavity located between them is set to negative pressure during flights. When the aircraft is back on the ground, this negative pressure has to be counteracted to open the plug, which can make the opening operation difficult. The adapter includes a (Continued)

lever that counteracts the negative pressure in the cavity of the adapter to allow easy opening of the plug with limited force.

12 Claims, 5 Drawing Sheets

(56) References Cited

U.S. PATENT DOCUMENTS

| | | | | |
|---|---|---|---|---|
| 4,286,727 A * | 9/1981 | Limoncelli | ............. | F16N 21/06 |
| | | | | 220/817 |
| 4,337,657 A * | 7/1982 | Morris | .................... | G01F 23/60 |
| | | | | 73/313 |
| 4,509,567 A * | 4/1985 | Harrison | ................ | F16N 21/06 |
| | | | | 184/88.1 |
| 4,703,867 A * | 11/1987 | Schoenhard | ........... | F01M 11/04 |
| | | | | 141/331 |
| 4,886,182 A * | 12/1989 | Fedelem | ................ | B60K 15/04 |
| | | | | 141/331 |
| 5,234,122 A * | 8/1993 | Cherng | ............. | B60K 15/0406 |
| | | | | 292/201 |
| 5,518,050 A * | 5/1996 | Dumas | .................. | F01M 11/04 |
| | | | | 141/351 |
| 5,950,692 A * | 9/1999 | Georgs | .................... | G01F 23/58 |
| | | | | 141/211 |
| 6,926,121 B2 * | 8/2005 | Gates | .................... | F01M 11/064 |
| | | | | 184/88.1 |
| 7,089,974 B2 * | 8/2006 | Stuart | ..................... | F16K 1/221 |
| | | | | 137/434 |
| 8,464,764 B1 * | 6/2013 | Milsom | ............ | B60K 15/035 |
| | | | | 137/202 |
| 2004/0065512 A1 * | 4/2004 | Gates | .................... | F01M 11/12 |
| | | | | 184/88.1 |
| 2012/0097482 A1 * | 4/2012 | Miller | .................... | F01M 11/12 |
| | | | | 184/6.4 |
| 2014/0231437 A1 * | 8/2014 | Snyder | .................... | F01D 25/00 |
| | | | | 49/506 |
| 2018/0320569 A1 * | 11/2018 | Rwashdeh | ......... | F01M 11/0458 |
| 2021/0003051 A1 * | 1/2021 | Daniel | .................. | F01M 11/04 |
| 2025/0067200 A1 * | 2/2025 | Bougelet | ................ | F01D 25/20 |

OTHER PUBLICATIONS

Written Opinion mailed Mar. 16, 2023, issued in corresponding International Application No. PCT/EP2023/050221, filed Jan. 6, 2023, 5 pages.

* cited by examiner

DEVICE CONFIGURED TO BE MOUNTED ON AN OIL TANK OF AN AIRCRAFT TURBOMACHINE, OIL SUPPLY ASSEMBLY AND ASSOCIATED METHOD OF USE

TECHNICAL FIELD

The present invention relates to a device configured to be mounted on an oil tank of an aircraft turbomachine. The present invention also relates to an oil supply assembly comprising at least one such device. The present invention further relates to a method of using such a device.

TECHNICAL BACKGROUND

Known aircraft engines comprise many components that require lubrication in order to operate efficiently. As such, the engines comprise oil tanks containing oil for lubricating engine components, such as gearboxes. EP 3 399 164 describes such an oil tank.

In order to supply oil to an engine, a person generally pours oil into the engine's oil tank, via an adapter disposed on the inlet of the oil tank. In order to ensure good fluid isolation from the oil tank, the adapter comprises two seals, a primary seal called the "plug" between the adapter and the outside of the adapter, and a secondary seal called the flapper between the adapter and the oil tank. An adapter cavity is located between these two seals.

During an aircraft flight, the adapter cavity is evacuated. When the aircraft returns to the ground, this vacuum must be counteracted to open the plug, which can make the opening operation difficult.

SUMMARY OF THE INVENTION

One objective of the invention is to assist in opening the plug of an aircraft turbomachinery oil tank. In particular, the invention proposes to counteract the negative pressure in the adapter cavity, and to allow easy plug opening with limited force.

To this end, the object of the invention is a device configured to be mounted on an oil tank of an aircraft turbomachine, comprising:
- a channel located between a device inlet and a device outlet, the device outlet being intended to be connected to the oil tank,
- a plug movably mounted on the device inlet and configured to take:
  - a venting position in which fluid can enter the channel through the device inlet, and
  - a sealing position in which the plug completely seals the device inlet;
- the device inlet comprising a projection and in that the device comprises a lever connected to the plug;
- the lever comprising a bearing elbow capable of bearing on the projection and pivoting about the projection between a projection contact position and a lifting position;
- the plug being in the sealing position when the lever is in its projection contact position, the plug being in the venting position when the lever is in its lifting position; and
- the lever moving the plug from its sealing position to its venting position as it pivots from the projection contact position to the lifting position.

According to an embodiment, the lever is movable between a rest position and the projection contact position, the lever being away from the projection when it is in the rest position, the plug being in the sealing position when the lever is in the rest position.

According to an embodiment, the projection comprises an orifice, and the plug comprises a closure pin able to enter the orifice so as to block the plug in its sealing position;
- when the lever is in its rest position, the closure pin is inserted into the orifice;
- when the lever is in its projection contact position, the closure pin being away from the orifice; and
- the rotation of the lever from its rest position to its projection contact position being configured to withdraw the closure pin from the orifice.

In one embodiment, the lever is secured to the closure pin by a lever pivot, the lever being pivotable about the lever pivot between its rest and projection contact positions.

According to one embodiment, the lever comprises a short arm extending between the bearing elbow and the lever pivot, the short arm having a first length, and a long arm forming a handle and extending over a second length from the bearing elbow, the second length being at least three times greater, advantageously five times greater, than the first length between the bearing elbow and the lever pivot.

According to one embodiment, the interior of the device is configured to be under negative pressure when the plug is in its sealing position.

According to one embodiment, the device comprises a filter disposed in the channel between the plug and the device outlet.

The invention also relates to an oil supply assembly comprising an oil tank having a tank inlet and at least one device as described above, the device outlet being connected to the tank inlet.

The invention also relates to a turbomachine comprising an oil supply assembly as described above.

The invention also relates to an aircraft comprising at least one turbomachine as described above.

The invention also relates to a method of using a device as described above, comprising the following steps:
- sealing the device inlet with the plug in its sealing position;
- causing the lever to bear against the projection;
- pivoting the lever about the projection between the projection contact position and the lifting position, the lever moving the plug from its sealing position to its venting position during this pivoting; and
- fluid entering the device through the device inlet.

The advantages mentioned for the device apply mutatis mutandis to the method.

BRIEF DESCRIPTION OF THE FIGURES

Other features and advantages of the invention will become apparent from the following detailed description, for the understanding of which reference is made to the appended figures, of which.

EMBODIMENTS OF THE INVENTION

The present invention is described with particular embodiments and references to figures, but the invention is not limited by them. The drawings or figures described are schematic only and are not limiting. Furthermore, the functions described may be performed by structures other than those described herein.

In the context of the present document, the terms "first" and "second" are used solely to differentiate the various elements and do not imply any order between these elements.

In the figures, identical or similar elements may bear the same references.

Figure 1:
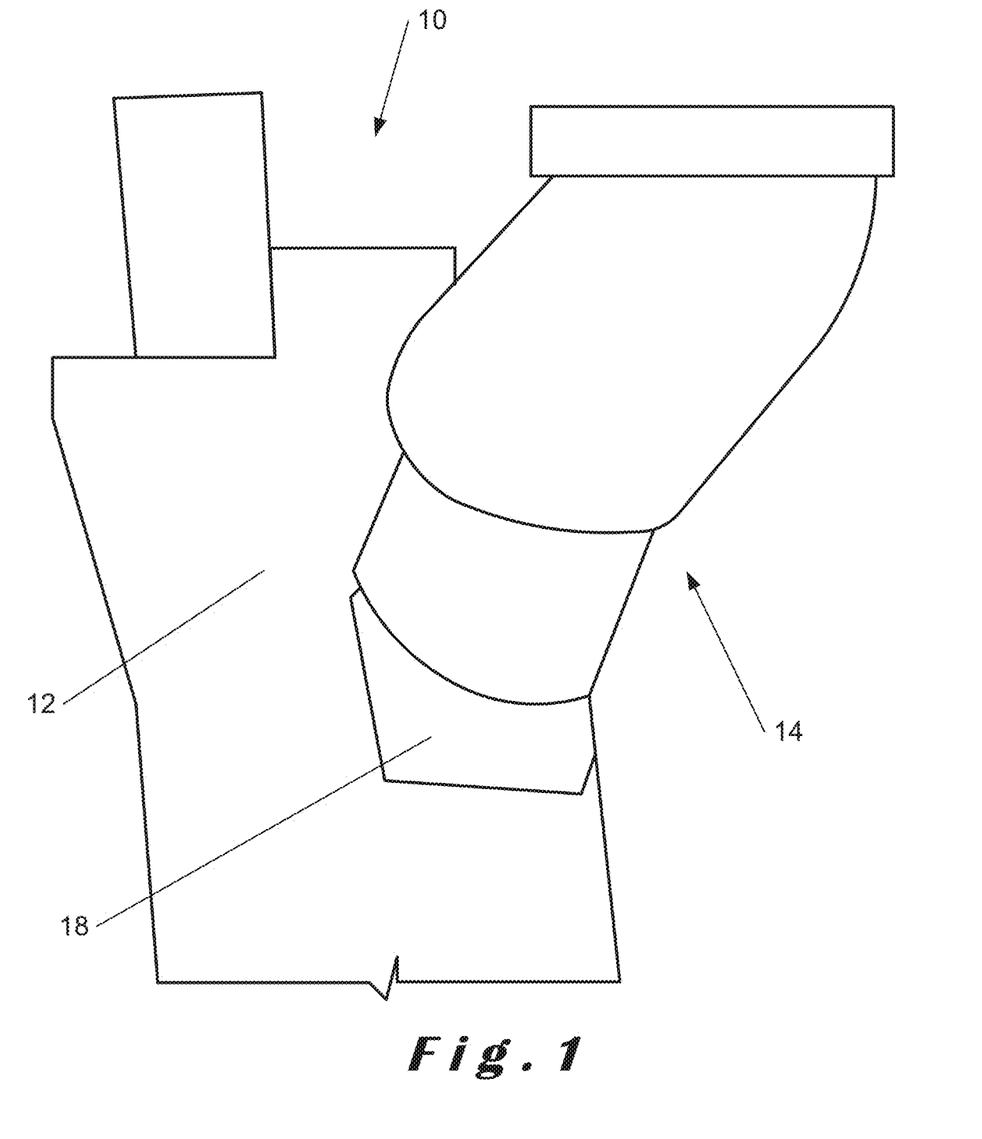
FIG. 1 is a schematic view of an oil tank inlet with a device according to the invention mounted on the tank inlet.

FIG. 1 shows an oil supply assembly 10. The oil supply assembly 10 comprises an oil tank 12 and at least one device 14 mounted on the oil tank 12.

The oil tank 12 has a tank inlet 18. The device 14 is connected to the tank inlet 18.

The device 14 according to the invention is in particular an adapter mounted on an oil tank. In particular, the adapter is configured to guide oil from an external container that contains oil to the oil tank when pouring the oil.

The supply assembly 10 belongs, for example, to a turbomachine. Such a turbomachine is typically mounted on an aircraft, for example a civil or military aircraft.

Figure 2:
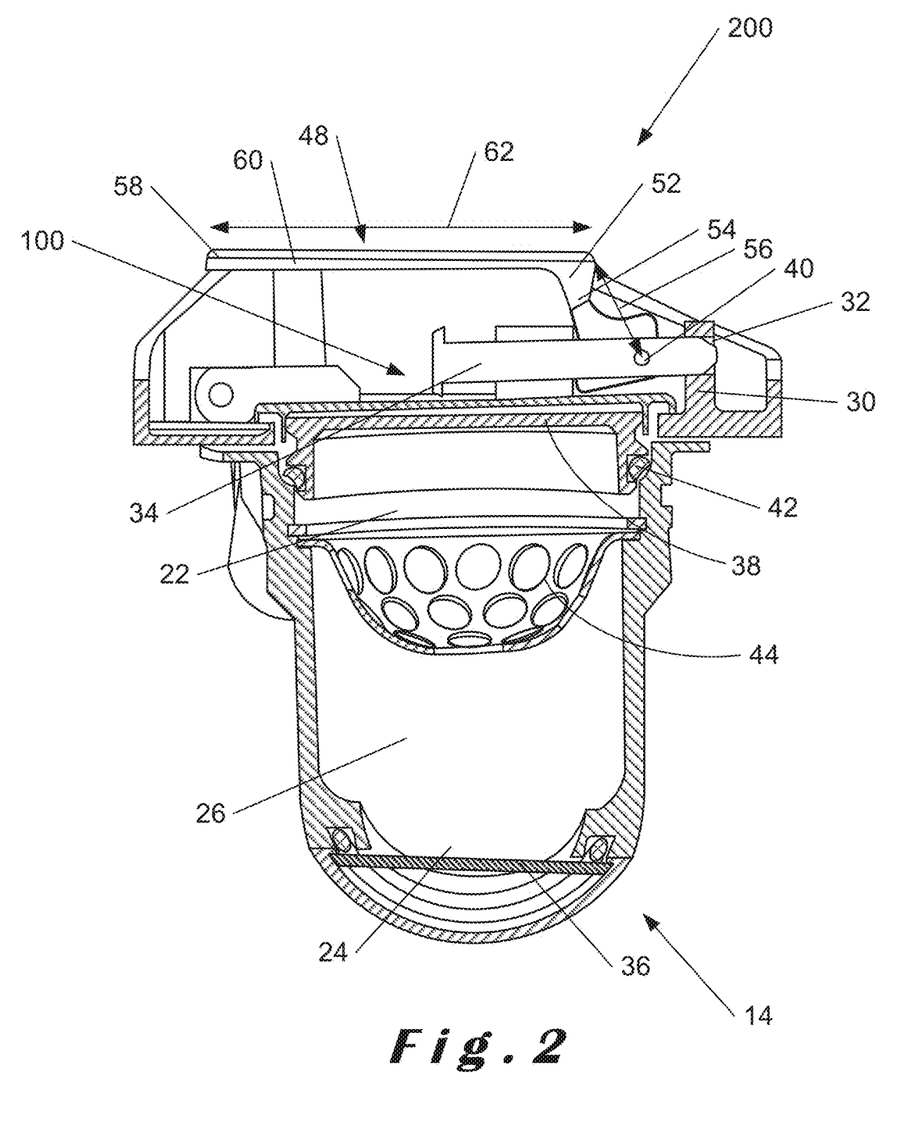
FIG. 2 is a schematic cross-sectional view of a device according to the invention, with the plug in the sealing position and the lever in the rest position.

FIG. 2 illustrates the closed device 14. FIGS. 2 to 5 show successive stages of opening device 14.

The device 14 comprises a device inlet 22, a device outlet 24, and a channel 26 located between the device inlet 22 and the device outlet 24. The device outlet 24 is connected to the tank inlet 18.

The device inlet 22 is circular in shape, for example. According to one embodiment, it has an area of between 5 cm² and 80 cm², and advantageously substantially equal to 20 cm².

The device inlet 22 comprises a projection 30 from the channel 26. According to the embodiment shown in FIGS. 2 to 5, the projection 30 extends substantially parallel to the channel 26 and extends in an opposite way from the device outlet 24 with respect to the device inlet 22.

Advantageously, the projection 30 comprises a hole 32 configured to receive a closure pin 34, as will be described below.

Advantageously, the device outlet 24 comprises a sealing membrane 36 configured to at least partially seal the channel 26. The sealing membrane 36 is intended to seal the device 14 when an undesirable leak occurs around the plug 38. In this case, the sealing membrane 36 is pressed against the outlet of the device 24 by the internal pressure of the oil tank 12.

The device 14 also comprises a plug 38. The plug 38 is movably mounted on the device inlet 22. The plug 38 is configured to assume a venting position 101 (illustrated in FIG. 5) in which fluid (in particular air) is able to enter the channel 26 through the device inlet 22, and a sealing position 100 (illustrated in FIGS. 2 to 4) in which the plug 38 completely seals the device inlet 22.

Advantageously, the plug 38 is also able to move to an open position which is beyond its venting position. In the open position the plug 38 is completely away from the device inlet 22. In one embodiment, the plug 38 in its open position abuts an edge surrounding the device inlet 22 so that the plug 38 is held in the open position without user intervention. The open position of the plug 38 allows the user to pour oil through the entire cross-section of the device inlet 22.

Figure 3:
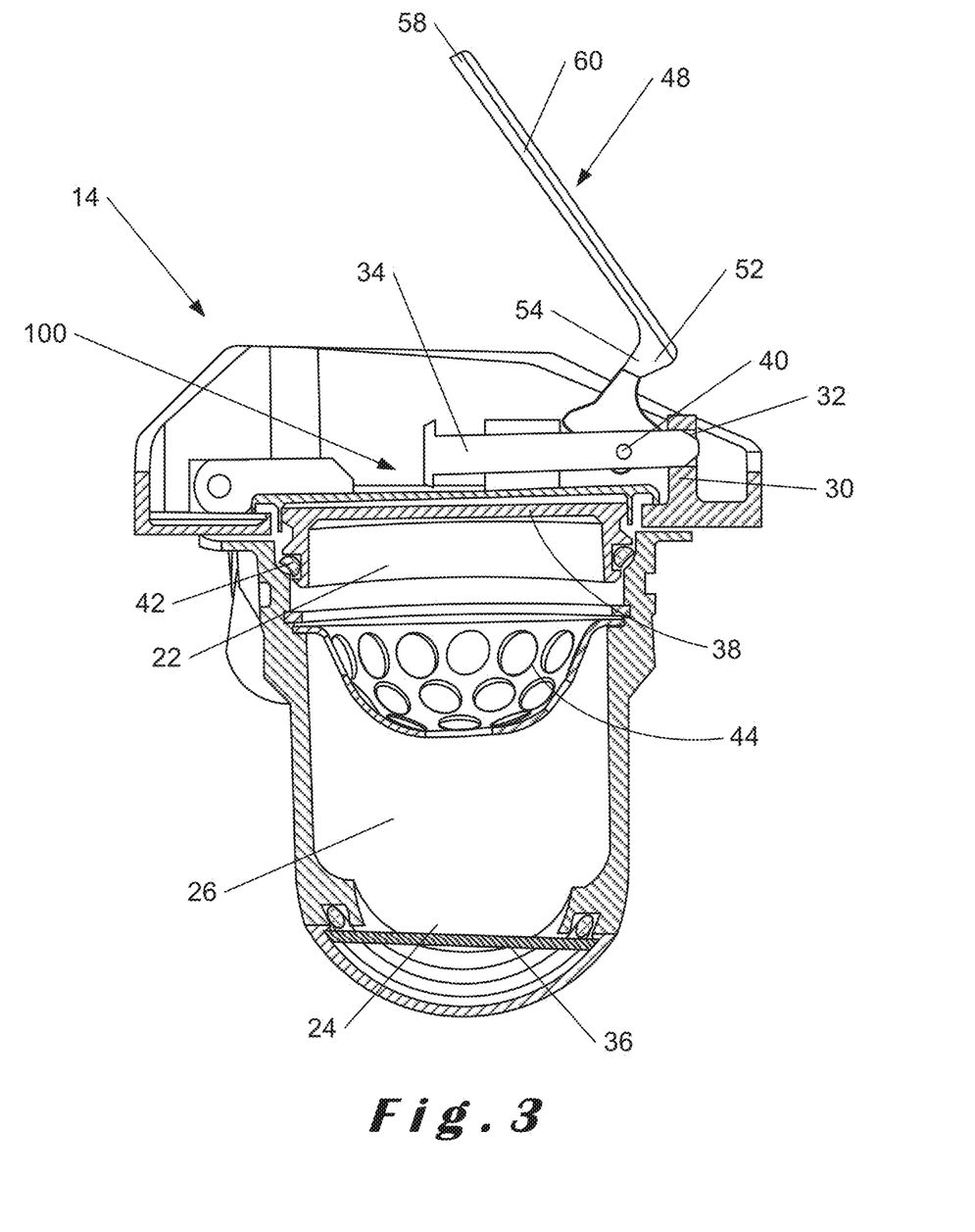
FIG. 3 is a schematic cross-sectional view of a device according to the invention, with the plug in the sealing position and the lever in an intermediate position between the rest position and the projection contact position.

According to the embodiment shown in the figures, the plug 38 comprises a closure pin 34. The closure pin 34 is displaceable. According to the embodiment shown in the figures, the closure axis 34 is movable substantially perpendicular to the channel 26. The closure pin 34 is able to enter the orifice 32, as shown in FIGS. 2 and 3, so as to block the plug 38 in its sealing position 100.

According to one embodiment, the closure pin 34 comprises a lever pivot 40.

Advantageously, the plug 38 comprises a seal 42 intended to come into contact with the channel 26 when the plug 38 is in its sealing position 100. The seal 42 allows the plug 38 to better isolate the channel 26 when the plug 38 is in its sealing position 100.

When the plug 38 is in its sealing position 100, the interior of the device 14 is subjected to negative pressure during flight. During ascent to altitude and during the flight phase at maximum altitude, the interior of device 14 will be at excess pressure relative to atmospheric pressure. During descent, the pressure inside device 14 will remain at the minimum pressure reached at altitude. On return to the ground, the pressure inside the device 14 may in some cases be lower than atmospheric pressure, which generates the negative pressure that must be overcome when the plug 38 is opened. According to one embodiment, the inside of the device has a pressure of less than 0.95 bar when the plug 38 is in its sealing position 100, or less than 0.92 bar, or even less than 0.9 bar.

Advantageously, the device 14 comprises a filter 44 disposed in the channel 26 between the plug 38 and the device outlet 24. The filter 44 is capable of retaining particles larger than 8 mm, advantageously larger than 6 mm, in order to prevent them from passing through the channel 26.

According to the embodiment shown in the figures, the filter 44 has a substantially hemispherical shape with its dome extending away from the plug 38. This shape is particularly suitable for preventing particles coming from the device inlet 22 from reaching the device outlet 24.

The device 14 also comprises a lever 48 connected to the plug 38. According to the embodiment shown in the figures, the lever 48 is connected to the plug 38 by the lever pivot 40.

Figure 4:
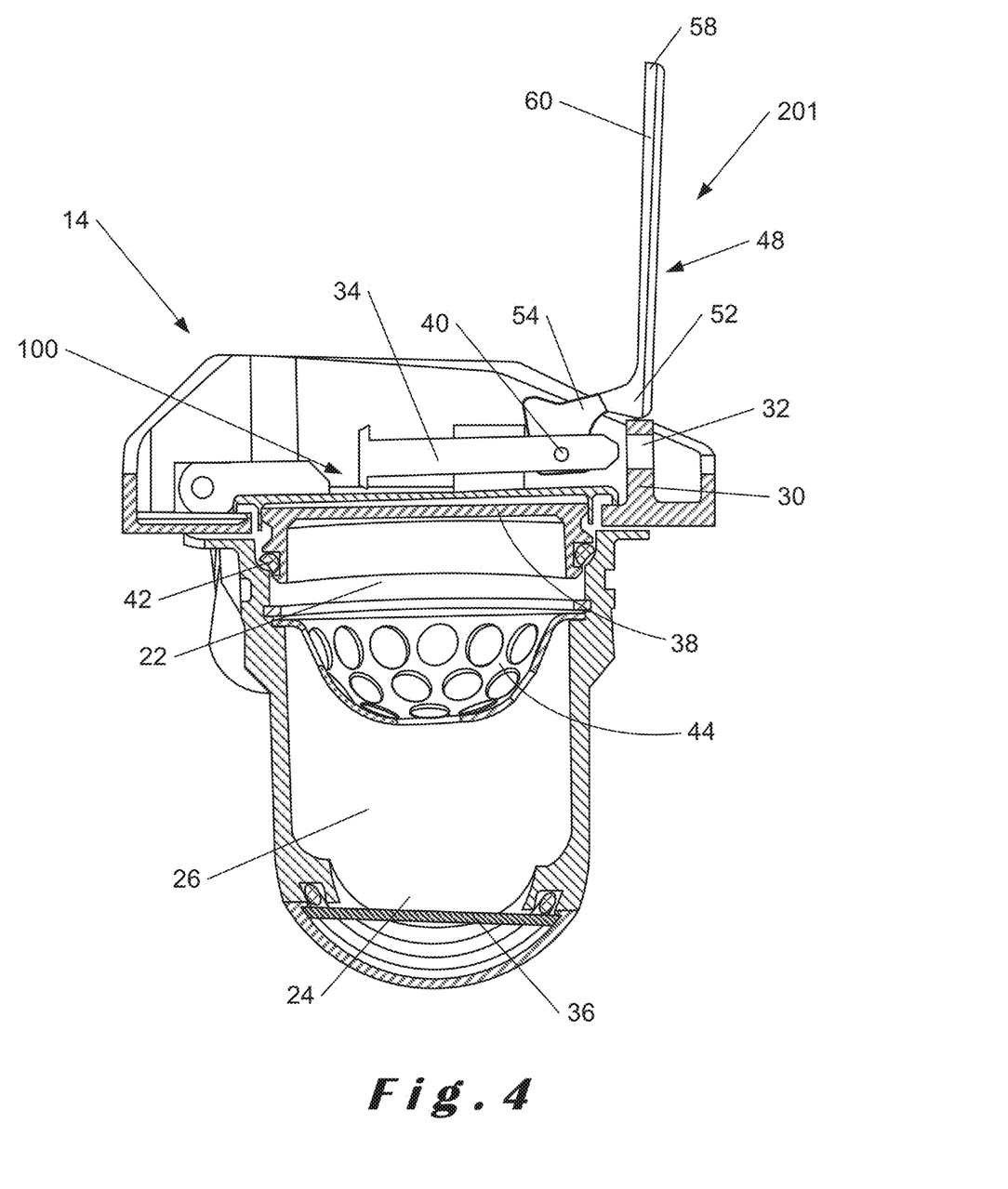
FIG. 4 is a schematic cross-sectional view of a device according to the invention, with the plug in the sealing position and the lever in the projection contact position.
Figure 5:
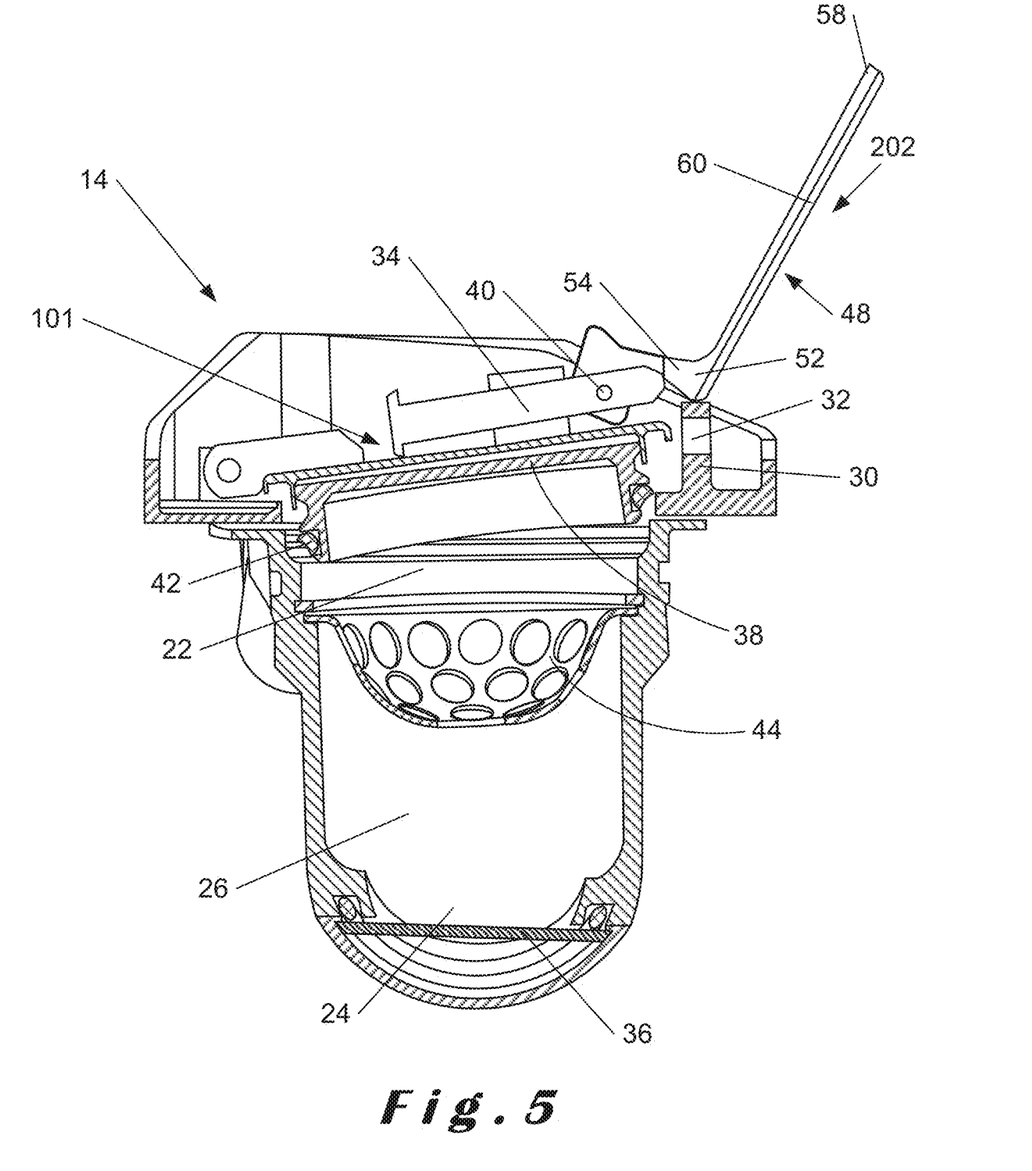
FIG. 5 is a schematic cross-sectional view of a device according to the invention, with the plug in the venting position and the lever in the lifting position.

FIG. 2 shows lever 48 in its rest position 200; FIG. 4 shows lever 48 in its projection contact position 201; and FIG. 5 shows lever 48 in its lifting position 202.

The lever 48 comprises a bearing elbow 52 capable of bearing on the projection 30. The lever 48 comprises a short arm 54 extending between the bearing elbow 52 and the lever pivot 40, and having a first length 56.

The lever 48 has a free lever end 58 opposite the bearing elbow 52. It is intended for a user to exert a force thereon to open the device 14. The lever 48 comprises a long arm 60 extending between the bearing elbow 52 and the lever end 58, and having a second length 62. This second length 62 is at least three times, preferably five times, greater than the first length 56 of the short arm 54. In other words, the lever 48 has a mechanical advantage greater than 3, preferably greater than 5.

With reference to FIGS. 2 to 4, the lever 48 is able to pivot about the lever pivot 40 between a rest position 200 (shown in FIG. 2) and a projection contact position 201 (shown in FIG. 4). The lever 48 is able to be a plurality of intermediate positions (one of which is illustrated in FIG. 3) between its rest position 200 and its projection contact position 201. When the lever 48 is in the rest position 200, the lever 48, in particular the bearing elbow 52, is away from the projection 30. When lever 48 is in the rest position 200, the plug 38 is in the sealing position 100. When lever 48 is in its rest position 200, the closure pin 34 is inserted into the orifice 32. Thus, a potential movement of the plug 38 from its sealing position 100 to its venting position 101 is prevented by the cooperation of the closure pin 34 with the orifice 32.

Advantageously, device 14 comprises a spring (not shown in the figures) configured to hold lever 48 in its rest position when the pivoting force exerted on lever 48 is below a threshold. The spring is located, for example, between the plug 38 and the closure pin 34.

Rotation of the lever 48 from its rest position 200 to its projection contact position 201 removes the closure pin 34 progressively from the orifice 32.

When the lever 48 is in the projection contact position 201, the lever 48 is in contact with the projection 30. According to the embodiment shown in the figures, when the lever 48 is in the projection contact position 201, the bearing elbow 52 is in contact with the projection 30.

When the lever 48 is in the projection contact position 201, the plug 38 is in the sealing position 100. Thus, during the movement of lever 48 between its rest position 200 and its projection contact position 201, the plug 38 always remains in the sealing position 100.

When the lever 48 is in its projection contact position 201, the closure axis 34 is away from the orifice 32.

With reference to FIGS. 4 and 5, after the lever 48 contacts the protrusion 30, the lever 48 is able to pivot about the protrusion 30 between the protrusion contact position 201 (shown in FIG. 4) and a lifting position 202 (shown in FIG. 5).

When the lever 48 is in its lifting position 202, the plug 38 is in the venting position 101. As the lever 48 pivots from the protrusion contact position 201 to the lifting position 202, the lever 48 moves the plug 38 from its sealing position 100 to its venting position 101.

The method of using the device 14 will now be briefly described.

Firstly, as illustrated in FIG. 2, the plug 38 is in its sealing position 100 and the lever 48 is in the rest position 200. The closure pin 34 is inserted into the orifice 32. The device inlet 22 is sealed by the plug 38 so that no fluid can enter or leave the channel 26.

When a user wishes to change the plug 38 to its venting position 101, he pivots the lever 48 about the lever pivot 40. The lever 48 passes through the intermediate positions before arriving at its projection contact position 201. During this pivoting of the lever 48 between its rest position 200 and its projection contact position 201, the closure pin 34 gradually moves out of the orifice 32.

The resistive force during pivoting of the lever 40 between its rest position 200 and its projection contact position 201 is principally the friction between the lever 48 and the closure pin 34 at the lever pivot position 40, and the friction between the closure pin 34 and the orifice 32.

According to the embodiment where the device 14 comprises the spring as described above, the resisting force during pivoting of the lever 40 from its rest position 200 to its projection contact position 201 further comprises the restoring force on the lever 48 towards its rest position.

Once the lever 48 reaches its projection contact position 201, the bearing elbow 52 bears against the projection 30. To continue pivoting the lever 48 from the projection contact position 201 to the lifting position 202, the user exerts a force on the lever 48, advantageously on the lever end 58, to counteract the resistance force. The resisting force during pivoting of the lever 48 between its projection contact position 201 and its lifting position 202 is primarily the vacuum inside the device 14 relative to the outside of the device 14. The force associated with this negative pressure is greater than the friction on lever 48 during pivoting of lever 40 between its rest position 200 and its projection contact position 201. With the use of the lever 48, the force required to open plug 38 is much smaller compared to when opening the plug 38 directly without using the lever 48.

As the lever 40 pivots from its projection contact position 201 to its lifting position 202, the lever 48 progressively moves the plug 38 from its sealing position 100 to its venting position 101.

Once the plug reaches its venting position 101, fluid (in particular air) is able to enter the device 14 through the device inlet 22.

Advantageously, to pour oil through the channel 26, the user continues to control the lever 48 from its venting position to its open position, for example by pulling the lever 48. According to one embodiment, the lever 48 is in contact with the plug 38 during at least part of the pivoting of the lever 48 between its venting position and its open position.

In other words, the invention relates to an adapter disposed on the inlet of an aircraft engine oil tank 12. The adapter comprises a plug 38 between the adapter and the exterior, and a flapper between the adapter and the oil tank. An adapter cavity 26, located between them, is set to negative pressure during flights. When the aircraft is back on the ground, this negative pressure has to be counteracted to open the plug, which can make the opening operation difficult. The invention proposes, by means of a lever 48, to counteract the negative pressure in the cavity of the adapter, and to allow easy plug opening with limited force.

The present invention has been described in relation to specific embodiments, which are purely illustrative and should not be considered limiting. Generally speaking, the present invention is not limited to the examples illustrated and/or described above. The use of the verbs "comprise", "include", or any other variant, as well as their conjugations, can in no way exclude the presence of elements other than those mentioned. The use of the indefinite article "a", or of the definite article "the", to introduce an element does not exclude the presence of a plurality of these elements. The reference numbers in the claims do not limit their scope.

The invention claimed is:

1. A device configured to be mounted on an oil tank of an aircraft turbomachine, the device comprising:
   a channel located between a device inlet and a device outlet, the device outlet being configured to be connected to the oil tank,
   a plug movably mounted on the device inlet and configured to take:
      a venting position in which fluid can enter the channel through the device inlet, and
      a sealing position in which the plug completely seals the device inlet;
   wherein the device inlet comprises a projection and in that the device comprises a lever connected to the plug;

the lever comprising a bearing elbow configured to bear on the projection and to pivot about the projection between a projection contact position and a lifting position;

the plug being in the sealing position when the lever is in the projection contact position, the plug being in the venting position when the lever is in the lifting position; and the lever moving the plug from the sealing position to the venting position as the lever pivots from the projection contact position to the lifting position.

2. The device according to claim 1, wherein the lever is movable between a rest position and the projection contact position, the lever being away from the projection when the lever is in the rest position, the plug being in the sealing position when the lever is in the rest position.

3. The device according to claim 2, wherein the projection comprises an orifice, and the plug comprises a closure pin configured to enter the orifice so as to block the plug in the sealing position;

when the lever is in its rest position, the closure pin is inserted into the orifice;

when the lever is in its projection contact position, the closure pin being away from the orifice; and rotation of the lever from its rest position to its projection contact position being configured to withdraw the closure pin from the orifice.

4. The device according to claim 3, wherein the lever is secured to the closure pin by a lever pivot, the lever being pivotable about the lever pivot between rest position and the projection contact position.

5. The device according to claim 4, wherein the lever comprises a short arm extending between the bearing elbow and the lever pivot, the short arm having a first length, and a long arm forming a handle and extending over a second length from the bearing elbow, the second length being at least three times greater than the first length between the bearing elbow and the lever pivot.

6. The device according to claim 5, wherein the second length is at least five times greater than the first length between the bearing elbow and the lever pivot.

7. The device according to claim 1, wherein an interior of the device is configured to be put under negative pressure when the plug is in its sealing position.

8. The device according to claim 1, further comprising a filter disposed in the channel between the plug and the device outlet.

9. An oil supply assembly, comprising an oil tank having a tank inlet and at least one device according to claim 1, the device outlet being connected to the tank inlet.

10. A turbomachine comprising the oil supply assembly according to claim 9.

11. An aircraft comprising at least one turbomachine according to claim 10.

12. A method of using the device according to claim 1, the method comprising the following steps:

sealing the device inlet with the plug in the sealing position;

causing the lever to bear against the projection; and pivoting the lever about the projection between the projection contact position and the lifting position, the lever moving the plug from the sealing position to the venting position during the pivoting;

wherein fluid enters the device through the device inlet.

* * * * *